United States Patent [19]

Ben-Michael et al.

[11] Patent Number: 5,404,353
[45] Date of Patent: Apr. 4, 1995

[54] DYNAMIC DEFER TECHNIQUE FOR TRAFFIC CONGESTION CONTROL IN A COMMUNICATION NETWORK BRIDGE DEVICE

[75] Inventors: Siman-Tov Ben-Michael, Girat Zeer; Philip P. Lozowick, Jerusalem, both of Israel; Henry Sho-Cheyans, Andover, Massachusetts

[73] Assignee: Digital Equipment Corp., Maynard, Mass.

[21] Appl. No.: 241,938

[22] Filed: May 12, 1994

Related U.S. Application Data

[63] Continuation of Ser. No. 900,023, Jun. 17, 1992, abandoned, which is a continuation-in-part of Ser. No. 722,747, Jun. 28, 1991, Pat. No. 5,339,313.

[51] Int. Cl.⁶ .............................................. H04L 12/56
[52] U.S. Cl. ...................................... 370/79; 370/85.2; 370/85.3; 370/85.13; 370/94.1
[58] Field of Search ....................... 370/79, 85.2, 85.3, 370/85.13, 85.14, 94.1

[56] References Cited

U.S. PATENT DOCUMENTS

| | | | |
|---|---|---|---|
| 4,063,220 | 12/1977 | Metcalfe et al. | 340/147 LP |
| 4,234,952 | 11/1980 | Gable et al. | 370/94 |
| 4,292,623 | 9/1981 | Eswaran et al. | 370/85 |
| 4,500,990 | 2/1985 | Akashi | 370/85.3 |
| 4,706,081 | 11/1987 | Hart et al. | 340/825.03 |
| 4,727,537 | 2/1988 | Nichols | 370/85 |
| 4,809,265 | 2/1989 | Hart et al. | 370/85 |
| 4,811,337 | 3/1989 | Hart | 370/85 |
| 4,849,970 | 7/1989 | McCool | 370/94.1 X |
| 4,876,742 | 10/1989 | Vacon et al. | 455/66 |
| 4,959,829 | 9/1990 | Griesing | 370/85.3 |
| 5,058,109 | 10/1991 | Goldberg et al. | 370/85.13 |

OTHER PUBLICATIONS

European Search Report, 13 Oct. 1992, Application No. EP 92 30 5675.
IEEE Network, vol. 2, No. 1, Jan. 1988, New York, N.Y. USA, pp. 72-76, M. Gerla et al., "Congestion Control in Interconnected Lans".
Computer Design, vol. 28, No. 3, 1 Feb. 1989, pp. 117-120 G. Rauh," Local Buffers Minimize Lan Data-- Rate Demands".
IEEE INFOCOM '89, vol. 1, Apr. 1989, Ottawa, Canada pp. 28-37, L. Merakos, et al, "Interconnection of CSMA/CD Lans Via an N-Port Bridge."
IEEE Trans. on Comm., Sep. 1989, Merakos et al., "Interconnection of CSMA/CD LANS Via an N-Port Bridge", pp. 28-37.

*Primary Examiner*—Douglas W. Olms
*Assistant Examiner*—Russell W. Blum
*Attorney, Agent, or Firm*—A. Sidney Johnston; Noel F. Heal

[57] ABSTRACT

A technique for controlling access to a bridge connected to at least two networks, such that network collisions are reduced, transmit live-lock conditions are eliminated, and buffer memory requirements are minimized. For at least one target network of the two networks, two dynamic lists are maintained, to keep track of data packets received from the target network and not yet forwarded, and to keep track of data packets stored for forwarding to the target network, but not yet forwarded. The target network uses a half-duplex medium and a CSMA/CD (Carrier Sense Multiple Access with Collision Detection) protocol. The invention operates by dynamically adjusting an inter packet gap (IPG) betweens data packets forwarded to the target network, such that stations on the target network are, under selected conditions, given an extended opportunity to transmit. The invention may also be used in conjunction with other techniques for reducing traffic congestion, such as adjusting network protocol parameters used in the target network, to either guarantee or deny priority to the target network in the event of a collision, based on the continually observed status of the two lists.

22 Claims, 5 Drawing Sheets

DYNAMIC DEFER TECHNIQUE FOR TRAFFIC CONGESTION CONTROL IN A COMMUNICATION NETWORK BRIDGE DEVICE

This application is a continuation of application Ser. No. 07/900,023, filed Jun. 17, 1992, now abandoned which is a continuation-in-part of application Ser. No. 07/722,247, filed on Jun. 28, 1991, U.S. Pat. No. 5,339,313.

BACKGROUND OF THE INVENTION

This invention relates generally to communication networks and, more particularly, to devices known as bridges, connected to two or more networks and providing a convenient mechanism for transferring data packets between one network and another. Even more particularly, the invention applies to networks that employ a protocol commonly referred to as Carrier Sense Multiple Access with Collision Detection (CSMA/CD). One such network is known as Ethernet.

Under the CSMA/CD rules for access to a network bus or cable, any station wishing to transmit must first "listen" to make sure that the cable is clear before beginning to transmit. All stations on the network have equal priority of access and may begin transmitting as soon as the line is clear and any required inter-packet delay has elapsed. However, if a first station that has started transmitting detects a "collision" with a transmission from another station, the first station continues transmitting for a short time to make sure that all stations wishing to transmit will detect the collision. Every other currently transmitting station that detects the collision also continues to transmit for a short time and terminates transmission. The stations involved in the collision select random, and therefore usually different, delay times before trying transmission again.

Partly because of the half-duplex operation of the networks to which the bridge is connected, the bridge has to provide buffer memory for temporarily storing data packets that it is unable to forward immediately onto the destination network. The size of the buffer memory depends on the amount of traffic that the bridge is called upon to handle, the congestion of the destination network, and the accepted level of packet loss. One possible solution to this difficulty is simply to provide a very large amount of buffer memory, so that there is practically always sufficient memory to store a data packet received from one network and destined for another network that is temporarily busy. However, a bridge with a very large buffer memory is costly to implement. For a bridge of lower cost, and smaller buffer memory, some form of congestion control is required, to limit the flow of data packets into the bridge. One way of doing this is, when receiving a data packet through one port of the bridge, to simply "jam" or inhibit data flow from the other port or ports of the bridge. Although this and similar techniques provide for a low-cost bridge implementation, they do not make the most efficient use of the bridge. Clearly, there is much room for improvement in providing traffic congestion control for bridges, and the present invention is directed to this end.

The cross-referenced application was concerned with techniques for handling traffic congestion by controlling the selection of backoff or delay values used in the event of contention for bus usage. By way of contrast, the present invention is concerned with a technique for reducing contention for the bus and thereby permitting use of smaller buffers, and improving network utilization because of a reduced number of collisions.

In the Ethernet implementation of the CSMA/CD protocol, there is a prescribed minimum time interval that a station must observe between consecutively transmitted or received packets. This minimum time interval, known as the inter packet gap (IPG), applies to the time between two received packets, the time between two transmitted packets, the time between the end of a received packet and the start of a packet transmission, and the time between the end of a transmitted packet and the start of receiving another packet. The time interval is specified to be 9.6µs (microseconds). A problem sometimes arises in a station that is unable to support this 9.6µs IPG. Some types of older station equipment still in widespread use are incapable of achieving a 9.6µs minimum IPG and instead provide a value of approximately 12µs. Such a station may be unable to start a transmission in the face of a continuous stream of data packets from the bridge, spaced apart by the specified 9.6µs IPG. This condition is referred to as transmit "live-lock."

Accordingly, it will be appreciated that there is need for further improvement in the field of congestion control in Ethernet bridges. The present invention satisfies this need.

SUMMARY OF THE INVENTION

The present invention resides in a method, and related apparatus, for controlling the flow of data packets between first and second networks through a bridge connected to both networks. For purposes of explanation, the first and second networks are referred to as the client interface and the communication interface, respectively, and the invention is described as regulating the flow of data packets to and from only the first network, the client interface. However, it will be understood as the description proceeds that the invention could be applied to the other network, or to both networks. The client interface may have one client station or multiple client stations connected to it, which may be the source or destination of message packets handled by the mechanism of the invention.

In terms of a novel method the invention may be defined in the context of a bridge device connected to the first and second networks. Briefly, and in general terms, the method comprises the steps of determining whether the bridge can accept a data packet from the first network; determining whether the bridge can accept and store at least a selected number of data packets from the second network; then selecting an appropriate value for an inter packet gap (IPG) interval for spacing between packets to be transmitted by the bridge onto the first network. An extended IPG interval is selected only if the bridge can accept a data packet from the first network and can accept and store at least the selected number packets from the second network. The extended IPG interval provides a greater opportunity for stations connected to the first network to transmit data, even when there is a continual flow of inbound data packets from the second network, and stations on the first network might otherwise be subject to a transmit live-lock condition. If the bridge cannot accept data packets from the first network, or if the inbound buffer is full beyond the preselected threshold, the method includes the step of selecting the nominal IPG value.

More specifically, the method also includes the steps of receiving inbound data packets from the second network; storing each inbound data packet, if necessary, until the first network becomes available; transmitting successive inbound packets onto the first network, wherein the transmitted inbound packets are separated by the inter packet gap (IPG); receiving outbound data packets from the first network; storing each outbound data packet, if necessary, until the second network becomes available; transmitting the outbound data packet onto the second network; and controlling the steps of transmitting to and receiving from the first network, to minimize buffering requirements, wherein the controlling step includes dynamically selecting the IPG to reduce contention for the first network and to reduce occurrences of transmit live-lock.

Even more specifically, the step of controlling transmitting to and receiving from the first network includes maintaining a list of packets received from the first network interface and not yet forwarded; maintaining a list of inbound packets received from the second network and not yet forwarded to the first network; and based on the status of the two lists of packets, selecting an extended IPG value when priority is to be given to transmission of stations connected to the first network, and selecting the nominal IPG value when priority is no longer to be given to the first network stations. The steps of selecting extended or nominal IPG values include determining whether the list of data packets received from the first network interface is empty; determining whether the list of inbound data packets is full beyond a preselected threshold; selecting an extended IPG value only if the list of data packets received from the first network is empty and the list of inbound data packets is not full beyond the preselected threshold; and otherwise selecting the nominal IPG value.

The method of the invention may also include steps relating to congestion control by other means. For example, the method may include the steps of detecting when the list of packets received from the first network is empty and adjusting first network protocol parameters to favor yielding first network access to a station on the first network in the event of a conflict for access to the first network, thereby guaranteeing successful retransmission of more packets from the station onto the first network; and detecting when the list of packets received from the first network is not empty and adjusting first network protocol parameters to favor retaining first network access in the event of a conflict for access, thereby giving priority to continued transmission of packets from the inbound buffer memory to the first network. Further, the method may include detecting when the list of packets received from the first network is full and the list of inbound packets is empty, and placing the first network in a busy condition, such as by applying a carrier signal to the network, so that the first network station cannot transmit further data packets onto the first network. The step of adjusting first network protocol parameters to favor yielding access to a first network station may include selecting a larger time interval to wait before retransmitting after a conflict for the network; and the step of adjusting first network protocol parameters to favor retaining access to the first network may include selecting a zero time interval to wait before retransmitting after a conflict for the network.

It will be apparent from the foregoing that the present invention represents a significant advance in the field of bridge devices for use with half-duplex CSMA/CD networks. In particular, the invention reduces contention of network access and reduces the occurrence of transmit live-lock conditions. Therefore, other congestion reduction techniques used in the event of a collision can operate more efficiently. It will be appreciated that, although the invention has been summarized in terms of a novel method, it may also be defined in terms of novel apparatus of similar scope.

It will also be appreciated that, although an embodiment of the invention is to be described in detail for purposes of illustration, the invention should not be limited to this illustrative embodiment. For example, although the invention is described as controlling access to one of two networks to which a bridge device is connected, it will be apparent that the same principles could be applied to the other network, or to both networks. More generally, the mechanism of the invention may be implemented in selected networks of a multiple-network communication system. Further, although the invention is well suited for application to networks in which loopback processing is a requirement, the principles of the invention are equally well suited to networks in which there is no requirement for loopback processing.

DESCRIPTION OF THE PREFERRED EMBODIMENT

Figure 1:
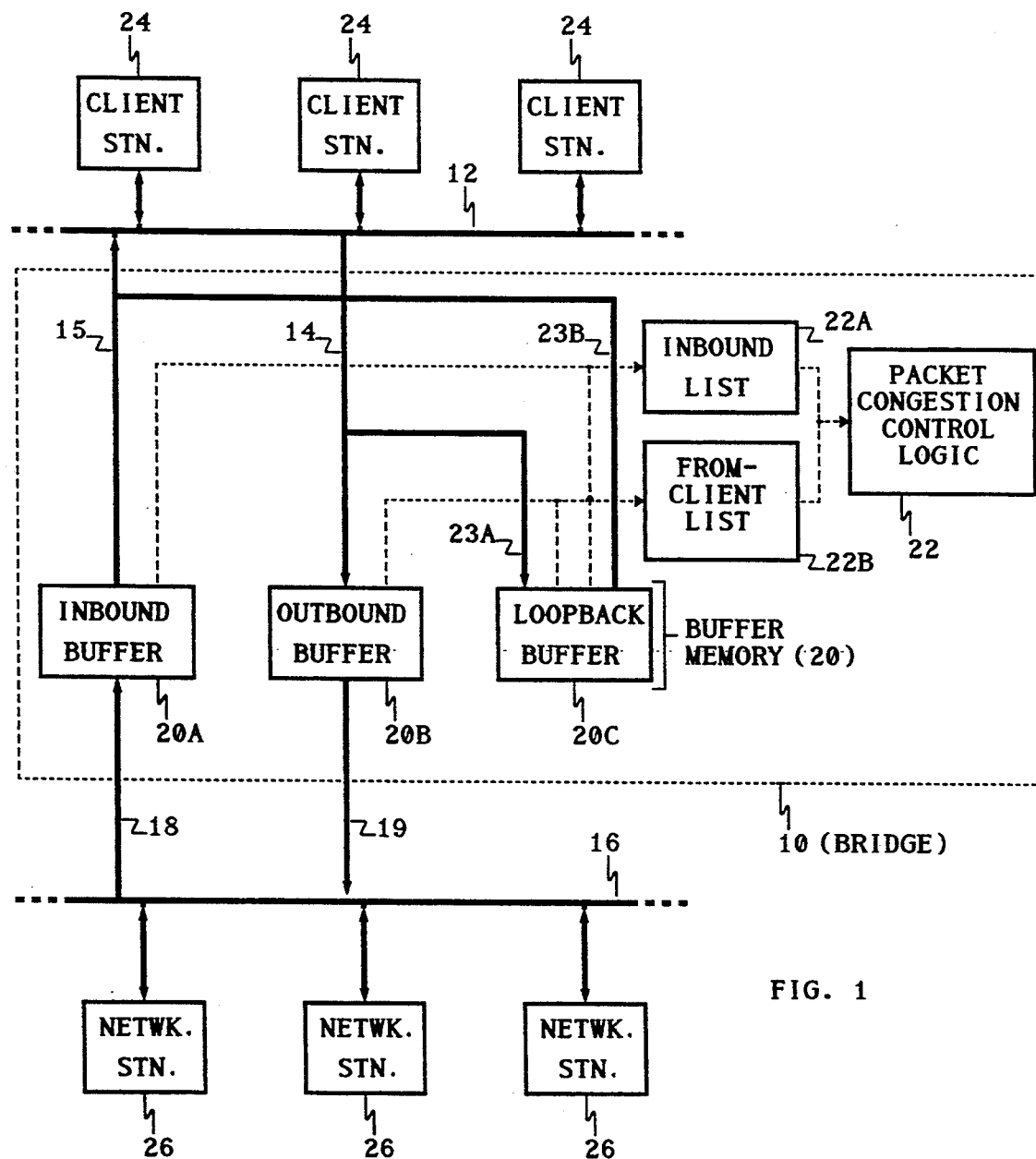
FIG. 1 is a simplified block diagram showing a bridge connected between a communication network, referred to as a backbone network and a client interface in accordance with the invention.

Environment of the Invention:

As shown in the drawings for purposes of illustration, the present invention is concerned with a technique for controlling congestion in a bridge connecting two CSMA/CD (Carrier Sense Multiple Access with Collision Detection) networks, by reducing the degree of contention for at least one of the networks. FIG. 1 shows the basic environment in which the invention is used. A bridge, indicated by reference numeral 10, is connected to a network referred to as a client interface 12, from which the bridge receives data packets over line 14 and to which the bridge transmits data packets over line 15. The bridge 10 is also connected to a communication network 16, which will be referred to in this specification as the backbone network. The bridge receives data packets from the backbone network 16 over line 18 and transmits packets to the backbone network over line 19. Of course, the bridge 10 may also be connected to other networks, but for purposes of explanation only two networks are considered in this description.

When the bridge 10 receives a data packet from the backbone network destined for the client interface, the latter may not always be available to accept the packet. Thus the bridge 10 needs to have a buffer memory 20 for the temporary storage of data packets being forwarded by the bridge. In general, there is little that the bridge can do to regulate the flow of traffic from the backbone network 16. If packet loss is to be kept to a reasonably low level, a relatively large buffer memory is needed to store these "inbound" packets received from the backbone network. To avoid having to use a very large buffer memory for packets received from the client interface, and to minimize packet loss, the bridge 10 also includes packet congestion control logic 22, which regulates the flow of data by modifying protocol parameters used in controlling access to the client interface 12. The client interface 12 has a number of client stations 24 connected to it, any of which may contend for access to the interface. Similarly, the backbone network 16 has multiple stations 26 connected to it.

In accordance with the invention, the packet congestion control logic 22 uses the status of inbound and outbound buffers 20A and 20B to determine an appropriate value for the inter packet gap (IPG), to reduce contention for the client interface 12, and to reduce the possibility of transmit live-lock. In the embodiment of the invention to be described in detail, the congestion control technique is applied to only one side of the bridge 10, but it will be apparent that the technique may, in an appropriate application, be applied symmetrically to both sides of the bridge. The implementation to be described by way of example is embodied in a bridge device that also provides "loopback" processing for one or more "clients" using the client interface 12. In loopback processing, a data packet received from the client interface 12 is processed in some way by the bridge 10 and returned to the client interface. For this purpose, the buffer memory 20 also includes a loopback buffer 20C, which receives data from the client interface 12 over line 23A and transmits data to the client interface over line 23B.

The packet congestion control logic 22 makes use of two lists that reflect the status of the inbound, outbound and loopback buffers 20A, 20B, 20C. An inbound list 22A contains an entry for each data packet stored in the inbound buffer 20A, and a from-client list 22B contains an entry for each data packet stored in the outbound and loopback buffers 20B and 20C.

The client interface 12 includes a half-duplex medium, such as Ethernet, employing a protocol commonly referred to as Carrier Sense Multiple Access with Collision Detection (CSMA/CD). Under the CSMA/CD rules for access to a network bus or cable, any station wishing to transmit must first "listen" to make sure that the cable is clear before beginning to transmit. All stations on the network have equal priority of access and may begin transmitting as soon as the line is clear and any required inter-packet delay has elapsed. However, if a first station that has started transmitting detects a "collision" with a transmission from another station, the first station continues transmitting for a short time to make sure that all stations wishing to transmit will detect the collision. Every other currently transmitting station that detects the collision also continues to transmit for a short time and terminates transmission. The stations involved in the collision select random, and therefore usually different, delay times before trying transmission again.

The nature of the CSMA/CD rules for network access are such that full-duplex transmission, i.e. transmitting and receiving at the same time, is not possible. If a station is receiving a packet, the network is busy and a transmission cannot be started, from this or any other station. Similarly, if a transmission is in progress from this station, no packet can be received at the same time, since no other sending station can gain access to the network while this station is sending a message. Therefore, the nature of operation of an Ethernet or other CSMA/CD station is half-duplex, i.e. messages can be both transmitted and received, but because of the nature of the network access rules, not at the same time.

The invention is illustrated in the context of a bridge having three logical buffers 20A, 20B and 20C, although it will be understood that the three buffers might be implemented as a single physical buffer, as described in the cross-referenced application. Moreover, it will be understood that the loopback buffer is needed only for cryptographic or other processing performed by the bridge in the illustrative embodiment. In applications of the invention in which loopback processing for cryptographic or other purposes is not required, only the inbound buffer and the outbound buffer are needed. The inbound buffer is used to store data packets received from the backbone network 16 and destined for the client interface 12. The outbound buffer is used to store data packets received from the client interface 12 and destined for the backbone network 16. The loopback buffer is used to store data packets that are received from the client interface 12, cryptographically or otherwise processed, and then returned to the client interface.

The packet congestion control logic 22 uses two queues or lists to keep track of data packets that are stored in the three buffers. The lists are referred to as the from-client list 22A and the inbound list 22B. The from-client list contains an entry for each data packet received from the client interface 12 and not yet forwarded to its destination. These include both outbound packets destined for the backbone network 16 and loopback packets destined to be returned to the client interface 12 after any required processing. In the illustrative embodiment of the invention, the from-client list contains a maximum of only two entries, to minimize buffer memory requirements in the device. Only one of the two entries in the from-client list may be for a data packet stored in the loopback buffer memory. Use of a small buffer in the device for packets received from the client interface 12 effectively forces the client or clients to buffer outgoing data packets. The inbound list contains an entry for each data packet received from the backbone network 16 and not yet forwarded to the client interface 12. Because the flow of traffic from the backbone network 16 is largely beyond the control of the bridge device of the invention, the inbound list has a large maximum number of entries. In the illustrative embodiment of the invention, 1,023 entries are permitted, only one of which may be for a data packet stored in the loopback buffer memory, and the remainder being for data packets stored in the inbound buffer memory. Both lists operate as first-in-first-out queues, and are handled during data input and output operations as shown in FIGS. 2A and 2B.

Figure 2A:
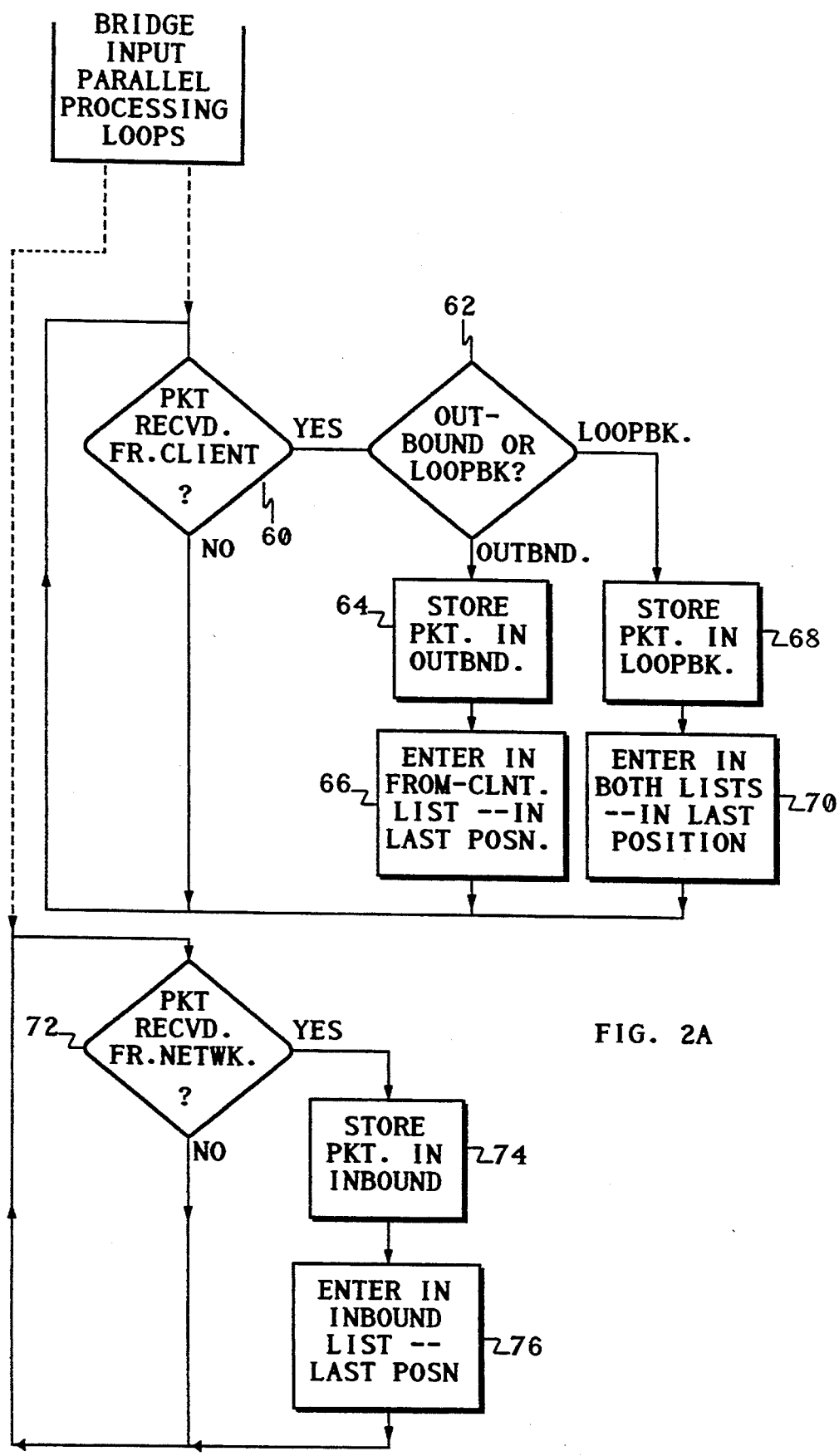
FIG. 2A is a flowchart of parallel bridge input processing functions.
Figure 2B:
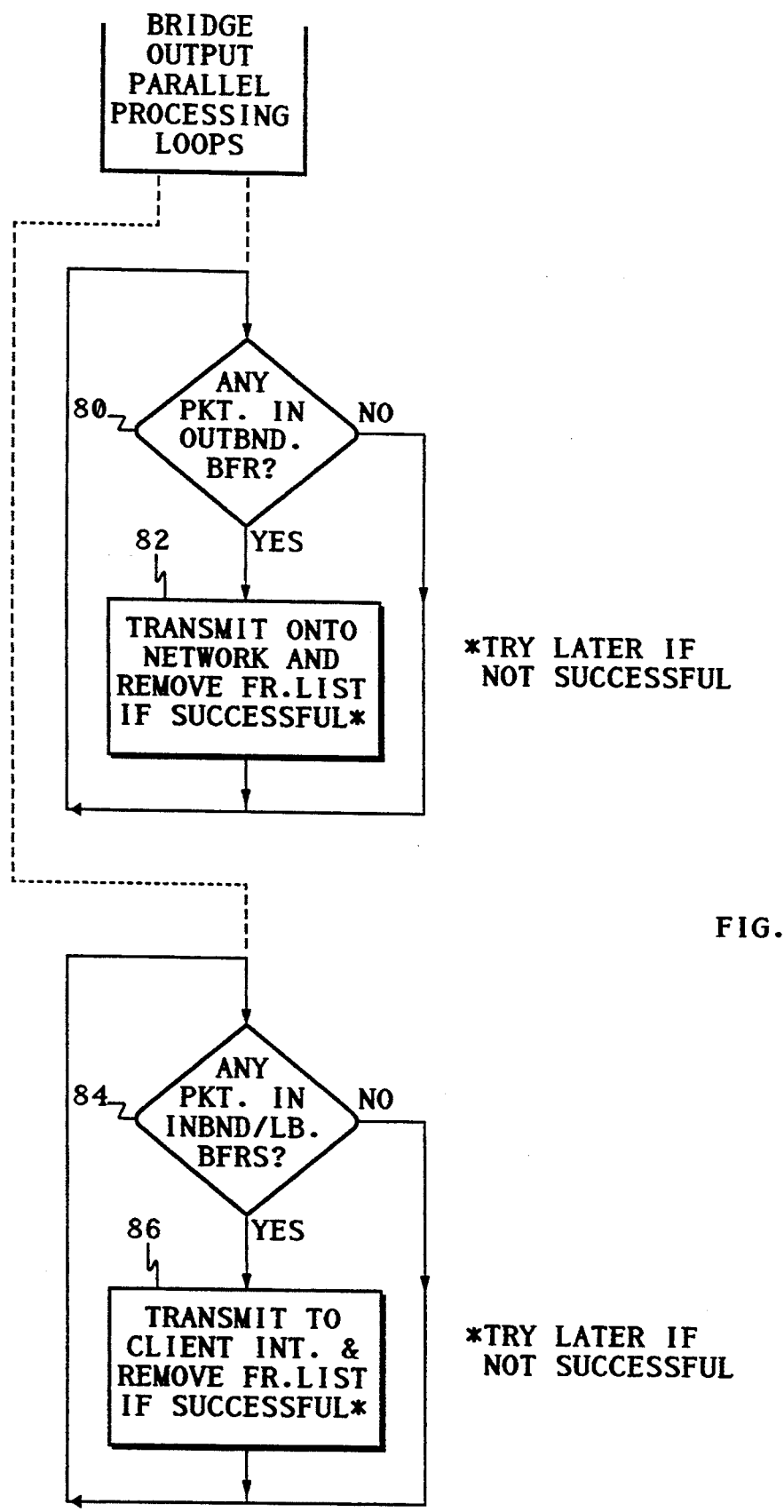
FIG. 2B is a flowchart of parallel bridge output processing functions.

Bridge Input and Output Processing:

Processing of bridge input traffic involves two parallel processing loops, as shown in FIG. 2A, one loop for processing packets received from the client interface 12 and the other for processing packets received from the backbone—network 16. If a data packet is received from the client interface 12, as determined in block 60, a determination is first made, in block 62, as to whether the packet is a loopback packet or an outbound packet.

If the received packet is an outbound packet, it is stored in the outbound buffer, as indicated in block 64, and an entry is made in the last position of the from-client list, as indicated in block 66. For a loopback packet, processing is similar except that the packet is stored in the loopback buffer, as indicated in block 68, then entries are made in the last position of both the from-client list and the inbound list, as indicated in block 70. For congestion control purposes, a loopback packet is treated as both a from-client packet and as an inbound packet. After processing a packet received from the client interface 12, in blocks 64, 66, 68 and 70, the processing loop continues in block 60, which continually detects input packets from the client interface.

In a similar processing loop to process packets received from the backbone network 16, block 72 determines whether a received packet is from the backbone network. If so, the received packet is stored in the inbound buffer, as indicated in block 74, and an entry is made in the inbound list, as indicated in block 76. The processing loop continues in block 72.

Bridge output processing proceeds basically as shown in FIG. 2B, with two parallel processing loops, one to process packets to be output to the backbone network 16 and the other to process packets to be output to the client interface 12. In processing output to the backbone network, the device first determines, in block 80, whether there is a packet in the outbound buffer 20B. If so, the bridge attempts to transmit the data packet onto the backbone network 16, as indicated in block 82. If the backbone network also uses CSMA/CD protocols, the attempted transmission may not be successful, in which case another attempt will be made after some selected random period of time. Following a successful transmission, the from-client list will be updated to remove an entry corresponding to the transmitted packet. The processing loop then continues checking for the presence of a packet in the outbound buffer 20B. The other output processing loop, shown at the bottom of FIG. 2B, includes checking to determine if any packet is waiting in the inbound or loopback buffers 20B and 20C, as indicated in block 84. If so, an attempt will be made to transmit the packet to the client interface 12, as indicated in block 86. Since the carrier interface uses CSMA/CD protocols, the attempt may not necessarily be successful, in which case another attempt will be made after some selected random period of time. Following a successful transmission, the lists are appropriately updated. For an inbound packet, the corresponding entry in the inbound list is removed. For a loopback packet, the corresponding entries in the inbound and from-client lists are removed. After these steps, the processing loop continues at block 84, which continually checks for the presence of packets in the inbound or loopback buffers 20B and 20C.

Figure 3:
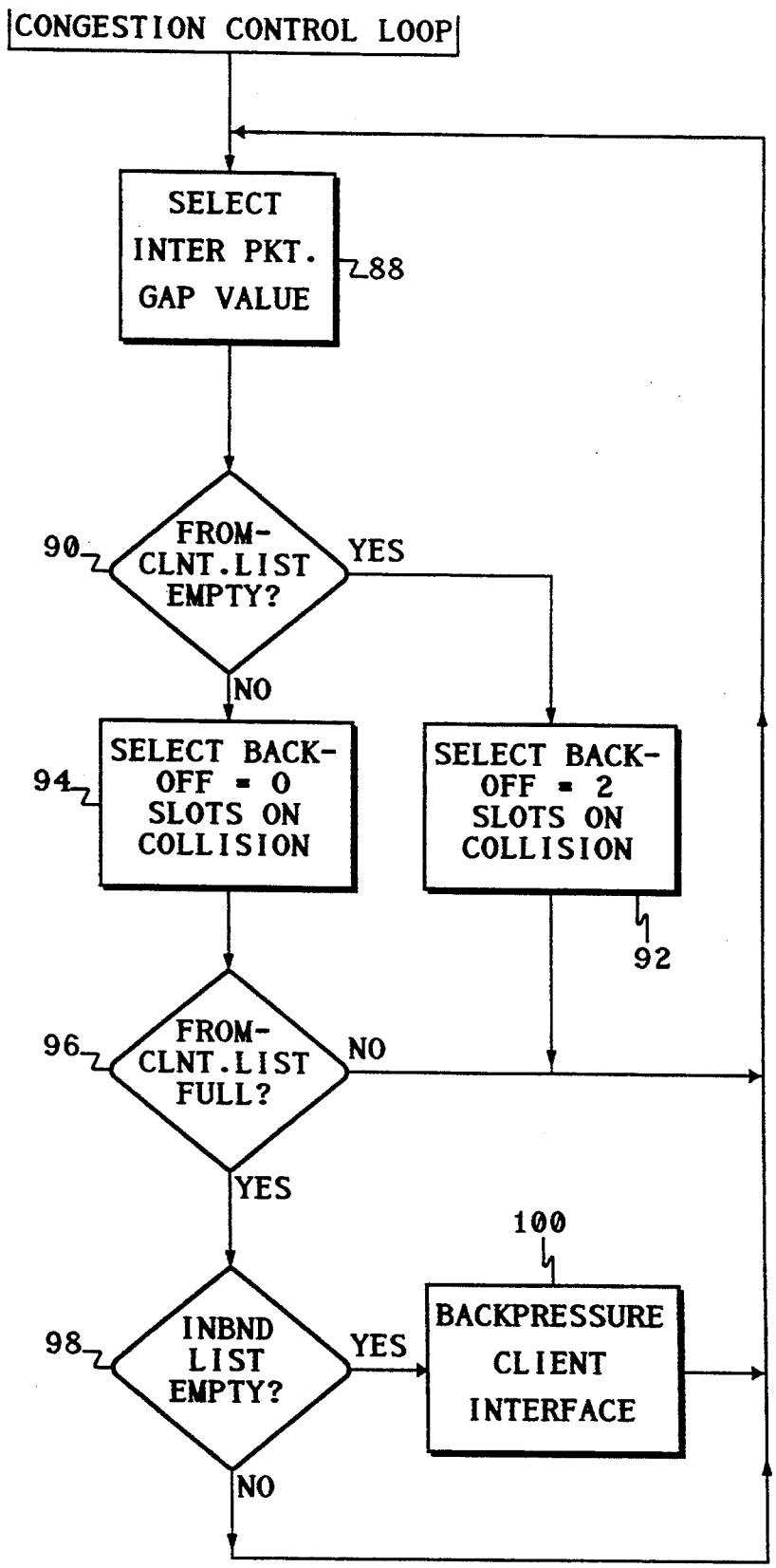
FIG. 3 is a flowchart of a congestion control loop in accordance with the invention.

Congestion Control in General:

The functions performed in congestion control are depicted in FIG. 3. It will be understood that the functions of congestion control, input processing and output processing are all performed in a practically simultaneous fashion, but are shown for convenience as separate functional loops in FIGS. 2A, 2B and 3. The first function of the congestion control loop depicted in FIG. 3 is to select an appropriate IPG value, as indicated in block 88. This is the principal function of the present invention, and might best be characterized as congestion avoidance, rather than congestion control. The function is illustrated in more detail in FIG. 4.

Congestion Control using Selective Backoff and Backpressure:

Although the present invention may be implemented without any other form of congestion control, it may be usefully combined with the congestion control techniques described in the cross-referenced patent application. These techniques are described here with reference to FIG. 2C. The remainder of the congestion control loop involves two tests of the status of the from-client and inbound lists. First, if the from-client list is empty, as determined in block 90, a backoff parameter of two slots is selected to be used in the event of a collision when transmitting to the client interface, as indicated in block 92. The backoff parameter value is typically measured in "slot times," a slot time being the network roundtrip delay in the maximum configuration of the network. The slot time may also be defined as the time to transmit 512 bits at a 10-megahertz serial data rate ($=51.2$ microseconds). Using a higher backoff value, i.e. a delay of two slot times instead of zero before trying to transmit again, ensures that a client connected to the client interface will be able to retransmit on the interface after the first collision. When the from-client list is empty, there are no outbound or loopback packets waiting to be forwarded or processed by the bridge. Therefore, if this condition is sensed following a collision with the client, the congestion control logic takes action to give priority to retransmission from the client onto the client interface, and from there to the bridge. Selecting a backoff value of 2 guarantees the client's transmission only following its first collision. A more general, and slightly more complex approach, to provide assurance of client transmission following any number of successive collisions, is described below.

If the from-client list is not empty, as determined in block 90, the backoff parameter value is set to zero, as indicated in block 94. This favors the bridge in any conflict for access to the client interface 12, since a zero backoff value will mean that the bridge will keep trying repeatedly for access, in the event of a collision. Because the from-client list is not empty, there is no point in giving priority to further transmission from the client to the bridge.

The second condition tested for by the congestion control logic involves two tests. If the from-client list has two entries in it, as determined in block 96, this indicates that the list is full. In the embodiment disclosed, the from-client list has room for a maximum of only two entries. If the from-client list is full by this test, it is next determined, in block 98, whether the inbound list is empty. If the from-client list is full and the inbound list is empty, this indicates that the bridge has two outbound packets stored in the outbound buffer for forwarding to the backbone network 16, and that there are no inbound or loopback packets waiting to be sent to the client interface 12. In such a condition, further input from the client interface must be prevented. This is effected by applying "backpressure" to the client interface, as indicated in block 100. Applying backpressure means impressing a carrier signal on the interface. To other users of the interface, i.e. to clients, the interface appears to be busy and no data packets can be transmitted. Although not explicitly shown in FIG. 3, it will be understood that, when the condition determined in blocks 96 and 98 no longer exists, the carrier backpressure will be removed and clients are again free to transmit onto the client interface 12.

If the from-client list is not full, as determined in block 96, there is no need to apply the backpressure because there is still room in the outbound buffer or the loopback buffer for at least one more packet from the client interface. If the from-client list is full but the inbound list is not empty, as determined in blocks 96 and 98, again there is no need to apply the backpressure because the inbound list indicates that there is at least one data packet to send to the client interface. Sending this data packet will render the client interface busy and inhibit any further data packets from being transmitted onto the interface. Further, because the from-client list is full, the backoff value will be set to zero (block 94), favoring the bridge in any conflict for the client interface.

Although multiple clients 24 may be connected to the client interface 12, when backpressure is applied to the interface none of the clients will be able to communicate through the interface, even to each other. However, this situation is not worse than having the multiple clients connected directly to the backbone network, because the fact that the outbound buffer is not empty indicates that the backbone network is busy and, therefore, if the clients were connected directly to the backbone network, they would also not be able to communicate with each other. In actuality the situation with the congestion control device in place is a little better, because if there is only one packet in the outbound buffer, the clients may still communicate with each other. They would not have been able to communicate if they were connected directly to the backbone network.

In summary, the bridge operates as follows. Whenever a packet is received from the client, a field in the packet header is checked to determine if the packet is a loopback packet or an outbound packet. If an outbound packet, it is placed in the outbound buffer and an entry is added to the end of the from-client list. If a loopback packet, it is placed in the loopback buffer and an entry is added to the end of both the from-client list and the inbound list. Whenever a packet is received from the network, it is placed in the inbound buffer and at the end of the inbound list. The lists are updated in accordance with the following rules:

1. All packets received from either side are added to their appropriate lists at the beginning of the reception operation. This is to facilitate "cut-through" operation, in which a packet is passed straight through the bridge without delay.

2. All packets transmitted to either side are removed from the appropriate lists once the transmission has passed the "network acquisition time," i.e. after the transmission has progressed to a point beyond which retransmission will not be needed.

3. If an inbound packet and a loopback packet are both first detected during the same timing cycle of the device, the inbound packet will take precedence and will be added to the inbound list before the loopback packet. The opposite rule could have been adopted as an alternative.

4. Congestion control is effected by continuous monitoring of the lists, as follows:

If the from-client list contains zero entries, the backoff value in the event of a collision is set to 2 instead of a random value. The client device will select a value of 0 or 1, thereby ensuring that, on its first retransmission, the client will be able to transmit packets to the bridge. (Selecting a backoff value of 2 guarantees the client's transmission only following its first collision. A more general, and slightly more complex approach, to provide assurance of client transmission following any number of successive collisions, is described below.)

If the from-client list is not empty, i.e. it contains one or two entries, the backoff value following a collision is set to 0, to give priority to device retransmission upon a collision with a client.

If the from-client list contains two entries, i.e. it is full, and the inbound list is empty, carrier backpressure is applied to the client interface, to inhibit further transmission from the client interface.

As described above, when the from-client list is empty the bridge device backoff value is set to 2 to give priority to a client retransmission. However, the CSMA/CD protocols are such that the client will be sure of priority only on the first retransmission try. After a collision, the normal CSMA/CD protocol calls for the use of randomly selected backoff value between 0 and 1. If there is a second collision, the backoff value is selected from 0 through 3; and after a third collision the backoff value may be between 0 and 7. There is a possibility that a client will encounter more than one collision, perhaps because of a conflicting transmission from another client, and the backoff value will be set to some number greater than 2. The client may not then be able to transmit a packet onto the client interface, and there is a small possibility that the client will have to discard a data packet, after sixteen unsuccessful transmission attempts. This is not a serious problem because, for the next packet that the client tries to transmit, the backoff value will be set to 0 or 1 for retransmission, and the client will have priority. There may also be bridge packet loss, which occurs when the bridge buffers are full and it has no buffering available to receive an incoming packet.

It is useful to consider the various situations that could result in the from-client list being full, i.e. having two entries. Since from-client packets may be outbound packets or loopback packets, it might first be surmised that a full from-client list could have two packets of either type, or one of each type. As a practical matter, however, the number of such possible combinations is fewer than this, because the receipt of a loopback packet effectively inhibits the receipt of further packets from the client interface. If a first loopback packet is received, it will generate an entry in both the inbound list and the from-client list. Because the from-client list is not empty, the backoff value will be set to zero in the event of a collision, giving retransmission priority to the bridge device, to transmit the loopback packet back to the client interface. Therefore, a second packet, whether it is a loopback packet or an outbound packet, cannot be received until the first loopback packet has been processed. If the first packet received is an outbound packet, a second packet may be received from the client interface, thereby filling the from-client list. The second packet may be an outbound packet or a loopback packet. An important reason for allowing no more than one loopback packet at a time is to regulate the frequency of loopback packets and to ensure that the device has a chance to empty out its inbound buffer. If the client were permitted to send an uninterrupted chain of loopback packets, it could cause an unacceptable level of inbound packet loss.

An important aspect of congestion control not yet described relates to the selection of a backoff value to give priority to the client, upon detection of an empty from-client list (block 90, FIG. 3). As described thus far, the backoff value selected is 2 time slots (block 92, FIG. 3). However, this value guarantees the client's transmission only following a first collision, since the client will select a value between 0 and 1 after a first collision. It will be recalled that the client will select a value in the range 0 through 3 after a second collision, then a value of 0 through 7 after a third collision, and so forth. Therefore, in a situation involving two or more successive collisions, the client may select a backoff value of 2 or more, and will not attain priority over the bridge device. This may result in an unacceptable level of packet loss.

In accordance with this aspect of congestion control, the backoff value selected in the bridge device is always at least one greater than the backoff value selected by the client. Specifically, the bridge maintains a count of the number, n, of consecutive collisions that have occurred for access to the client interface. When a packet is received from the client interface, the count, n, is cleared; and is subsequently incremented for each detected collision between the bridge and the client. When the bridge decides to give priority to the client, by detection of an empty from-client list, the backoff value selected is computed from the nth power of 2, where n is the number of consecutive collisions. Thus, after one collision the backoff value is 2, after two consecutive collisions it is 4, after three consecutive collisions it is 8, and so forth. The backoff value is, therefore, one greater than the highest possible value that can be selected by the client.

In order to avoid unacceptable packet loss in the inbound buffer, because the bridge device is waiting much longer before sending inbound packets to the client, n will typically have some upper limit which will be determined by the acceptable packet loss. The presently preferred approach is to choose the upper limit of n dynamically, as a function of the available remaining space in the inbound buffer. Alternatively, since packet loss is calculated statistically, it is possible to choose the number of slots to backoff to be a fraction of $2^n$, for example $2^{n-+1}-1$. Statistically, the random backoff number chosen by the client will be between 0 and $2^{n-1}$ half the time, so the selection of a backoff value of $2^{n-}+1$ will ensure priority for the client half the time.

Figure 4:
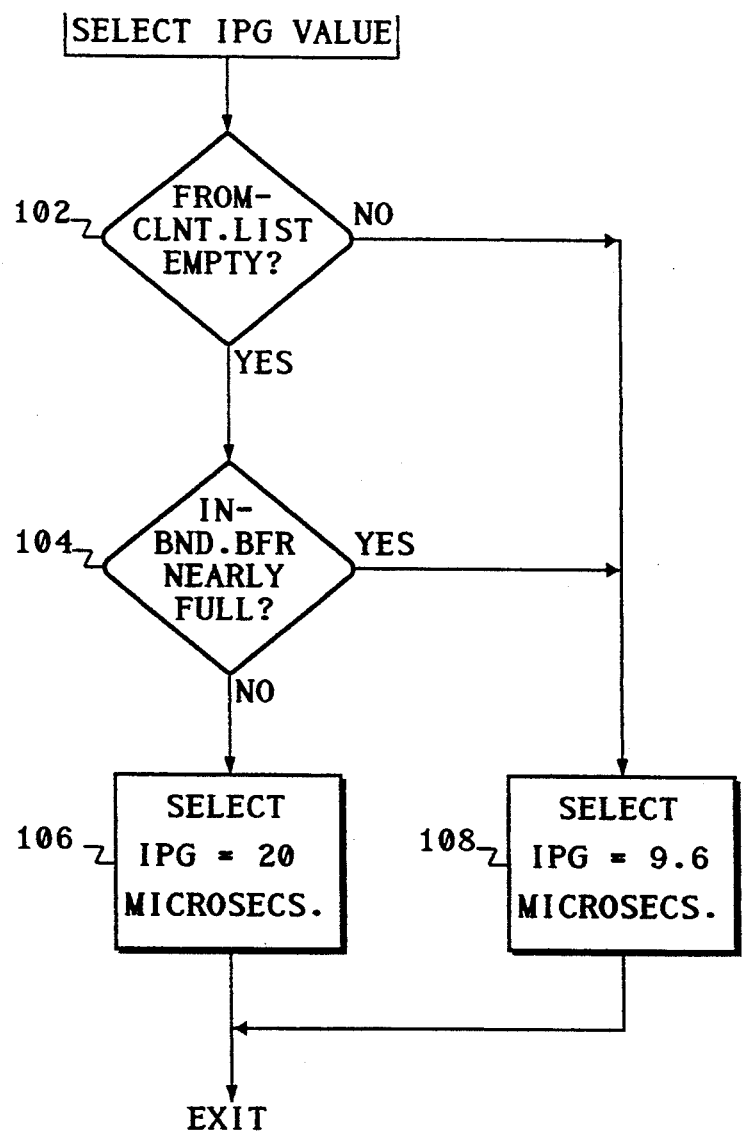
FIG. 4 is a flowchart of the dynamic defer function of the invention.

Congestion Control by Selection of IPG Value:

The principal aspect of the present invention involves congestion control by appropriate selection of the inter packet gap (IPG), the minimum time interval between end of receipt of a packet and the beginning of transmission of a packet, and also the minimum time interval between packets of data transmitted by the bridge onto the client interface 12. The manner in which the IPG is selected is shown in FIG. 4.

If the from-client list 22B (FIG. 1) is empty, as determined in block 102, and if the input buffer is full less than a selected threshold level, as determined in block 104, then the IPG is set at a value greater than the usual 9.6μs, such as at 20μs, as indicated in block 106. If the from-client list is not empty, or if the input buffer is full beyond the selected threshold, as determined in blocks 102 or 104, the IPG is set to its usual value of 9.6μs.

When the from-client list is empty, this indicates that no outbound or loopback packets are awaiting processing in the outbound buffer 20B or the loopback buffer 30C, and the bridge device could, therefore, accept one or more packets from the client interface. Further, if the input buffer is not more full than a selected threshold, this indicates that the input buffer can hold a substantial number of additional inbound data packets. Both of these factors together, i.e. ability to handle a packet from the client interface and ability to handle additional inbound packets from the communication interface, without packet loss, indicate that the bridge can afford to give client stations a more favorable opportunity to transmit onto the client interface. By extending the IPG to 20μs, the bridge provides client stations with an extended opportunity to transmit onto the client interface without a collision. For client stations that do not have the capability to transmit within the usual 9.6μs IPG, the extended IPG may be the only opportunity provided for transmission at times when there is heavy inbound message traffic. Therefore, a transmit live-lock condition is avoided by the use of the extended IPG. Without the extended IPG, the bridge could keep sending back-to-back data packets to the interface without interruption. For client stations that can support the 9.6μs IPG, the extended IPG reduces the likelihood of collisions that can occur when the bridge and client stations contend for the client interface.

At first thought, it might be supposed that an even simpler solution to the problem addressed by the invention would be for the bridge to select the larger IPG always when transmitting to the client, thereby always giving client stations an extended opportunity to transmit. The difficulty with this simplistic solution is that it does not handle the situation in which back-to-back data packets are received from the backbone network, with an IPG of 9.6μs. If these packets are transmitted to the client network with an IPG of 20μs, packets will be received in the bridge faster than they can be transmitted, due to the mismatch in IPG values, and the inbound buffer memory 20A will eventually fill up and further incoming packets will be lost. This effect is minimized by selecting a 9.6μs IPG under certain conditions.

When the from-client list is not empty, the normal 9.6μs IPG is used. It will be recalled that the from-client list has a maximum length of two entries, so it would not be appropriate to encourage further transmissions by client stations when the bridge had not finished processing an earlier outbound or loopback data packet. Similarly, once the inbound buffer reaches a threshold level, priority should be given to avoiding buffer overflow, by processing and forwarding inbound packets stored in the buffer, rather than deferring to the transmissions of client stations.

In accordance with some network protocols, such as one implemented by Digital Equipment Corporation under a standard designated DEC STD 134B, the IPG is divided into two distinct phases. During the first phase, the bridge will defer to a transmission from another station, i.e. if a client station begins transmission during this phase, the bridge will not begin transmitting, even though it has a data packet ready to send. If a station begins a transmission during the second phase, the bridge will begin transmitting any data packet that it has ready to send, thereby forcing a collision and causing the colliding stations to back off. In DEC STD 134B, the 9.6μs IPG is divided into a first phase of 6.0μs referred to as IPS1 and a second phase of 3.6μs referred to as IPS2. In the presently preferred embodiment of the invention, an extended IPG of 20μs has its IPS1 phase extended to 16.4μs. The IPS2 phase remains at 3.6μs.

Although the present invention may be used on its own, to provide congestion control by reducing the frequency of collisions on a network, and by reducing the possibility of transmit live-lock, the dynamic defer technique also serves to improve operation of the congestion control approach claimed in the cross-referenced application. Thus, as illustrated, in FIG. 3, the dynamic defer technique of the invention can be combined with dynamic selection of backoff values and selectively applying backpressure to the client interface.

It will be appreciated from the foregoing that the present invention represents a significant advance in the field of bridge devices for forwarding data packets from one network to another. In particular, the invention reduces the frequency of contentions for access to at least one network to which the bridge is connected, and reduces the occurrence of transmit live-lock conditions. These advantages are achieved by dynamic adjustment of the inter packet gap (IPG) used by the bridge in forwarding data packets to the client interface. When conditions are appropriate, the IPG is extended in length to allow client stations an extended opportunity to transmit data onto the client interface, thereby eliminating transmit live-locks and reducing contention for the client interface. The dynamic defer technique of the invention may be used to further advantage in conjunction with other congestion control approaches.

It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A method for controlling the flow of data packets that are either outbound from a half-duplex client interface using a Carrier Sense Multiple Access with Collision Detection (CSMA/CD) protocol, to a backbone network, or inbound from the backbone network to the client interface, in such a manner as to minimize buffer memory requirements, the method comprising the steps of:

receiving inbound data packets from a backbone network;
   storing each inbound data packet, if necessary, until the client interface becomes available;
   transmitting successive inbound packets onto the client interface, wherein the transmitted inbound packets are separated by a minimum time interval referred to as the standard inter packet gap; an inter packet gap is hereinafter referred to as an IPG;
   receiving outbound data packets from the client interface;
   storing each outbound data packet, if necessary, until the backbone network becomes available;
   transmitting the outbound data packets onto the backbone network; and
   controlling the steps of transmitting to and receiving from the client interface, to minimize buffering requirements, wherein the controlling step includes dynamically selecting an IPG to reduce contention for the client interface and to reduce occurrences of transmit live-lock.

2. A method as defined in claim 1, wherein the step of controlling the steps of transmitting to and receiving from the client interface includes:

maintaining a list of packets received from the client interface and not yet forwarded;
   maintaining a list of inbound packets received from the backbone network and not yet forwarded to the client interface; and
   based on the status of the two lists of packets, selecting an extended IPG value when priority is to be given to transmission of client stations connected to the client interface, and selecting the standard IPG value when priority is no longer to be given to the client stations.

3. A method as defined in claim 2, wherein the steps of selecting extended or standard IPG values include:

determining whether the list of data packets received from the client interface is empty;
   determining whether the list of inbound data packets is full beyond a preselected threshold;
   selecting an extended IPG value only if the list of data packets received from the client interface is empty and the list of inbound data packets is not full beyond the preselected threshold; and
   otherwise selecting the standard IPG value.

4. A method as defined in claim, wherein the step of controlling the steps of transmitting to and receiving from the client interface further includes:

detecting when the list of packets received from the client interface is empty and adjusting client interface protocol parameters to favor yielding client interface access to a client in the event of a conflict for access to a client interface, thereby guaranteeing successful retransmission of more packets from the client onto the client interface; and
   detecting when the list of packets received from the client interface is not empty and adjusting client interface protocol parameters to favor retaining client interface access in the event of a conflict for access, thereby giving priority to continued transmission of packets from the inbound buffer memory to the client interface.

5. A method as defined in claim 4, wherein the step of controlling the steps of transmitting to and receiving from the client interface further includes:

detecting when the list of packets received from the client interface is full and the list of inbound packets is empty, and placing the client interface in a busy condition so that the client device cannot transmit further data packets onto the client interface.

6. A method as defined in claim 4, wherein:

the step of adjusting client interface protocol parameters to favor yielding access to a client device includes selecting a larger time interval to wait before retransmitting after a conflict for the interface; and
   the step of adjusting client interface protocol parameters to favor retaining access to the client interface includes selecting a zero time interval to wait before retransmitting after a conflict for the interface.

7. A method as defined in claim 5, wherein:

the step of placing the client interface in a busy condition includes applying a carrier signal to the client interface.

8. Apparatus in a bridge device for processing of data outbound from a half-duplex client interface using a Carrier Sense Multiple Access with Collision Detection (CSMA/CD) protocol, to a backbone network, and inbound from the backbone network to the client interface, while minimizing buffer memory requirements, the apparatus comprising:

means for receiving inbound data packets from a backbone network;

an inbound buffer memory, for storing each inbound data packet until the client interface is available;

means for transmitting successive inbound data packets onto the client interface, wherein the transmitted inbound packets are separated by a minimum time interval referred to as the standard interpacket gap, an interpacket gap is hereinafter referred to as an IPG;

means for receiving outbound data packets from the client interface;

an outbound buffer memory, for storing each outbound data packet until the backbone network is available;

means for transmitting a data packet from the outbound buffer memory onto the backbone network; and means for controlling the means for transmitting to and receiving from the client interface, to minimize buffering requirements, wherein the means for controlling includes means for dynamically selecting the IPG to reduce contention for the client interface and to reduce occurrences of transmit live-lock.

9. Apparatus as defined in claim 8, wherein the means for controlling the means for transmitting to and receiving from the client interface includes:

means for maintaining a list of packets received from the client interface and not yet forwarded;

means for maintaining a list of inbound packets received from the backbone network and not yet forwarded to the client interface; and means operable in response to the status of the two lists of packets, for selecting an extended IPG value when priority is to be given to transmission of client stations connected to the client interface, and for selecting the standard IPG value when priority is no longer to be given to the client stations.

10. Apparatus as defined in claim 9, wherein the means for selecting extended or standard IPG values include:

means for determining whether the list of data packets received from the client interface is empty;

means for determining whether the list of inbound data packets is full beyond a preselected threshold;

means for selecting an extended IPG value only if the list of data packets received from the client interface is empty and the list of inbound data packets is not full beyond the preselected threshold; and means for selecting the standard IPG value otherwise.

11. Apparatus as defined in claim 9, wherein the means for controlling the means for transmitting to and receiving from the client interface further includes:

means for detecting when the list of packets received from the client interface is empty and adjusting client interface protocol parameters to favor yielding client interface access to a client in the event of a conflict for access to the client interface, thereby guaranteeing successful retransmission of more packets from the client onto the client interface; and means for detecting when the list of packets received from the client interface is not empty and adjusting client interface protocol parameters to favor retaining client interface access in the event of a conflict for access, thereby giving priority to continued transmission of packets from the inbound buffer memory to the client interface.

12. Apparatus as defined in claim 11, wherein the means for controlling the means for transmitting to and receiving from the client interface further includes:

means for detecting when the list of packets received from the client interface is full and the list of inbound packets is empty, and placing the client interface in a busy condition so that the client device cannot transmit further data packets onto the client interface.

13. Apparatus as defined in claim 11, wherein:

the means for adjusting client interface protocol parameters to favor yielding access to a client device includes means for selecting a larger time interval to wait before retransmitting after a conflict for the interface; and the means for adjusting client interface protocol parameters to favor retaining access to the client interface includes means for selecting a zero time interval to wait before retransmitting after a conflict for the interface.

14. Apparatus as defined in claim 12, wherein:

the means for placing the client interface in a busy condition includes means for applying a carrier signal to the client interface.

15. A method for controlling the flow of data packets that are either outbound from a half-duplex first network using a Carrier Sense Multiple Access with Collision Detect (CSMA/CD) protocol, to a second network, and inbound from the second network to the first network, in such a manner as to minimize buffer memory requirements, the method comprising the steps of:

receiving inbound data packets from the second network;

storing each inbound data packet, if necessary, until the first network becomes available;

transmitting successive inbound packets onto the first network, wherein the transmitted inbound packets are separated by a minimum time interval referred to as the standard inter packet gap, an inter packet gap is hereinafter referred to as an IPG;

receiving outbound data packets from the first network;

storing each outbound data packet, if necessary, until the second network becomes available;

transmitting the outbound data packet onto the second network; and controlling the steps of transmitting to and receiving from the first network, to minimize buffering requirements, wherein the controlling step includes dynamically selecting the IPG to reduce contention for the first network and to reduce occurrences of transmit live-lock.

16. A method as defined in claim 15, wherein the step of controlling the steps of transmitting to and receiving from the first network includes:

maintaining a list of packets received from the first network interface and not yet forwarded;

maintaining a list of inbound packets received from the second network and not yet forwarded to the first network; and based on the status of the two lists of packets, selecting an extended IPG value when priority is to be given to transmission of stations connected to the first network, and selecting the standard IPG value when priority is no longer to be given to the first network stations.

17. A method as defined in claim 16, wherein the steps of selecting extended or standard IPG values include:
   determining whether the list of data packets received from the first network is empty;
   determining whether the list of inbound data packets is full beyond a preselected threshold;
   selecting an extended IPG value only if the list of data packets received from the first network is empty and the list of inbound data packets is not full beyond the preselected threshold; and
   otherwise selecting the standard IPG value.

18. A method as defined in claim 16, wherein the step of controlling the steps of transmitting to and receiving from the first network further includes:
   detecting when the list of packets received from the first network is empty and adjusting first network protocol parameters to favor yielding first network access to a station on the first network in the event of a conflict for access to the first network, thereby guaranteeing successful retransmission of more packets from the station onto the first network; and
   detecting when the list of packets received from the first network is not empty and adjusting first network protocol parameters to favor retaining first network access in the event of a conflict for access, thereby giving priority to continued transmission of packets from the inbound buffer memory to the first network.

19. A method as defined in claim 18, wherein the step of controlling the steps of transmitting to and receiving from the first network further includes:
   detecting when the list of packets received from the first network is full and the list of inbound packets is empty, and placing the first network in a busy condition so that the first network station cannot transmit further data packets onto the first network.

20. A method as defined in claim 18, wherein:
   the step of adjusting first network protocol parameters to favor yielding access to a first network station includes selecting a larger time interval to wait before retransmitting after a conflict for the network; and
   the step of adjusting first network protocol parameters to favor retaining access to the first network includes selecting a zero time interval to wait before retransmitting after a conflict for the network.

21. A method as defined in claim 19, wherein:
   the step of placing the first network in a busy condition includes applying a carrier signal to the first network.

22. For use in a bridge device connected to first and second networks, a method for reducing contention for network access, comprising the steps of:
   determining whether the bridge can accept a data packet from the first network;
   determining whether the bridge can accept and store at least a selected number of data packets from the second network;
   selecting an extended interpacket gap, an interpacket gap is hereinafter referred to as an IPG interval for spacing between packets to be transmitted onto the first network, but only if the bridge can accept a data packet from the first network and can accept and store at least the selected number packets from the second network, whereby the extended IPG interval provides a greater opportunity for stations connected to the first network to transmit data; and
   otherwise selecting a standard IPG value.

* * * * *